Patented Mar. 22, 1927.

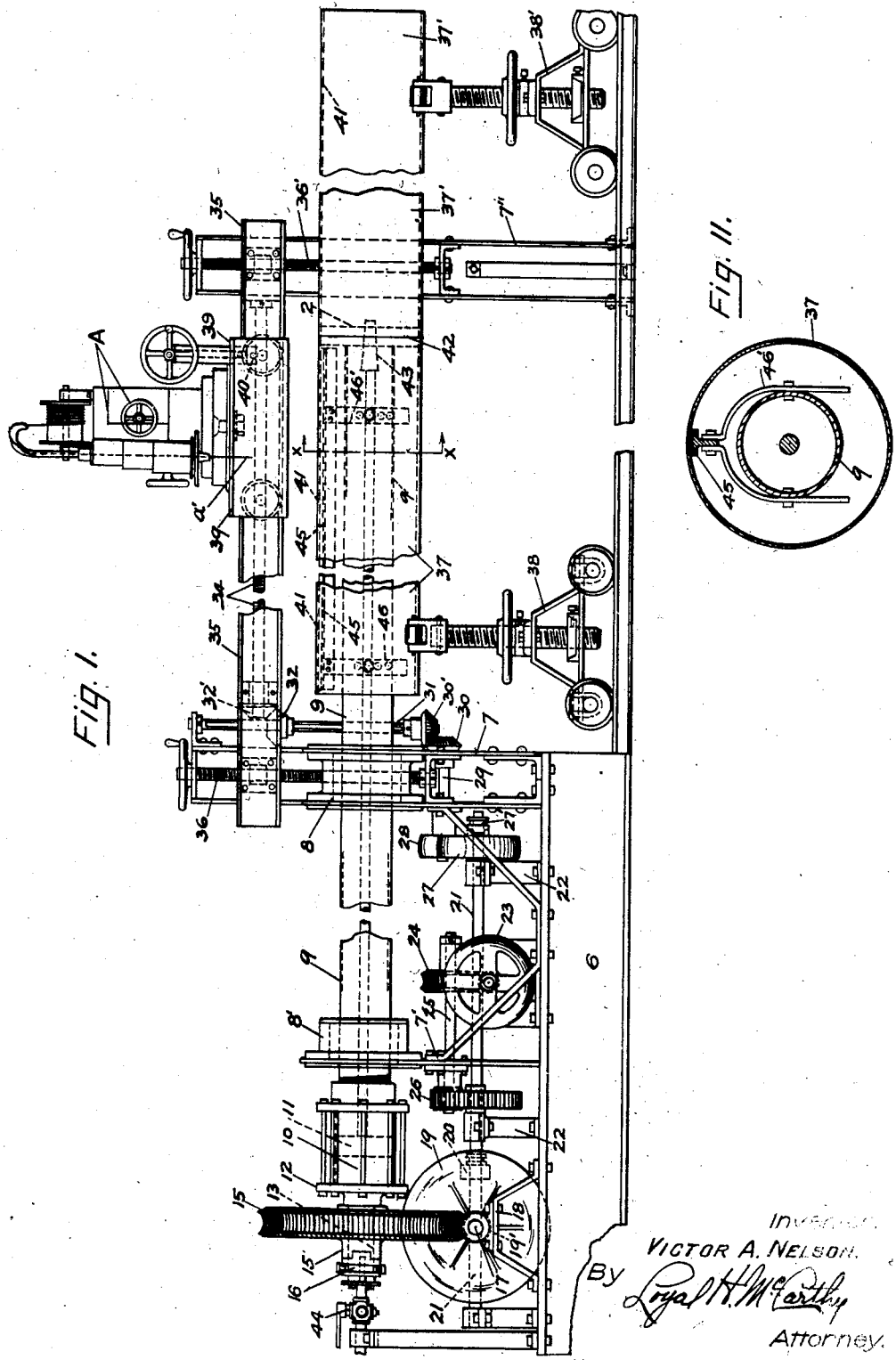

1,622,251

UNITED STATES PATENT OFFICE.

VICTOR A. NELSON, OF PORTLAND, OREGON.

ELECTRIC-ARC-WELDING MACHINE.

Application filed December 1, 1922. Serial No. 604,178.

My invention relates to machines using the electric arc welding process of joining metal sheets of steel, iron and other ferrous materials, in the manufacture of pipes, tanks and pressure vessels.

The invention consists in the new and novel arrangement of parts and the application of new principles in mechanical construction to facilitate the operation of electric welding and improve the uniformity and consequent quality of the work.

It is well known to those familiar with the art to which this invention appertains that the quality of a weld by the electric arc welding process is dependent largely upon two factors, the first of which is the uniform intensity of the electric arc, the second factor being the degree of uniformity with which the arc is moved along the joint being welded.

The objects of my invention are to produce a mechanism that will substitute uniform mechanical motions not dependent upon manual operations to produce the required regularity.

Another object of my invention is to produce a mechanism that can be varied widely in its speed range by simple adjustments. And a further object is to provide the necessary backing for the joint being welded, of a material that will not fuse to the work.

I accomplish the objects above enumerated by the mechanism illustrated in the accompanying drawings, in which Fig. I is an elevation of my new machine, and Fig. II is a sectional view of Fig. I at X—X, Fig. I.

A base (6) supports pedestals (7 and 7') which in turn support roller bearings (8 and 8'). A hollow mandrel (9) is journalled in the roller bearings (8 and 8'). The said hollow mandrel (9) projects through the roller bearing (8) for a considerable distance as shown by the dotted outline, and has an expansible sectional head (2) on its extreme end, which expansible sectional head (2) has coppery contact surfaces and is of the type described in the application of William H. Pearce for a patent upon an improvement in welding mandrels, filed June 27, 1922, being Serial No. 571,321, series of 1915. The said hollow mandrel (9) also projects through the roller bearing (8') and a cylinder (10) containing a piston (11) is securely affixed to the said hollow mandrel (9) so that the axis of the cylinder (10) and the hollow mandrel (9) are coincident. The cylinder (10) is supplied with a cylinder head (12), an extending portion of which forms a journal (13) for a worm wheel (15). The said worm wheel (15) has part of a jaw clutch formed on its hub (15') which co-operates with the jaw clutch (16), which is splined upon the extended portion of the journal (13), thus permitting selective rotation of the hollow mandrel (9) and its attached parts by the engagement or disengagement of the jaw clutch (16) with the hub (15').

The worm wheel (15) is in continuous engagement with a worm shaft (17) mounted upon suitable bearings, one of which is shown at numeral 18.

The said worm shaft (17) is fitted with a friction disc (19) upon which bears a friction pinion (20), mounted upon the line shaft (21) which is supported in proper relation to the other elements by the boxes (22 and 22'). The friction pinion (20) is splined upon the line shaft (21) and is movable longitudinally thereon across the entire width of the friction disc (19), and as the friction pinion revolves as hereinafter described, a variable motion of the friction disc (19) in either direction may be produced at will. In the center of the friction disc (19) is a spot indicated by numeral 19', that is bored or turned to an appreciable depth below the general plane of the friction disc (19), the purpose of which is to prevent the contact of the friction pinion (20) with the friction disc (19) when it passes or is placed at the center of the said friction disc (19).

The prime mover of the machine is the motor (23) which is preferably of the variable speed type and having as great a range of speeds as is consistent with its economical operation. Rotative motion is transmitted through a worm on the motor shaft (not shown) to the worm gear (24) mounted upon the jack shafting (25).

A spur pinion (26) mounted upon the jack shaft (25) transmits a revolving motion to the line shaft (21) and thence through the mechanism heretofore described to the hollow mandrel (9).

The line shaft (21) has mounted thereon a loose pulley (27), controlled by the clutch (27'), which co-operates with the tight pulley (28) to transmit revolving motion through the stub shaft (29), the mitre gears (30 and 30'), the vertical shaft (31), the bevel gears (32 and 32') to the lead screw (34). A movable guide rail (35) adjustable vertically by the screws (36 and 36'), is supported upon the pedestals (7 and 7") and comprises a way for a carriage (39) carrying a welding machine (A). The said welding machine (A) is of the general character of machines, the purpose of which is to maintain a uniform intensity of arc at the point of the electrode wire ($a'$) which is fed to the work as fast as required. The said welding machine (A) is no part of my present invention, saving and excepting that its use is necessary to a proper functioning of my new device.

Cylinders to be welded (37 and 37') are supported in position upon the hollow mandrel (9) and by the adjustable stands (38 and 38'). Proper longitudinal alignment of the cylinders (37 and 37') being secured by the sectional expansible head (2).

A carriage (39) is slidably mounted upon the movable guide rail (35) and provided with an adjustable grab nut (40) for engagement with the lead screw (34). It is intended to show longitudinal seams to be welded in the cylinders (37 and 37'), by the dotted line 41 and a girth seam to be welded is shown by the line 42.

A tapered spindle (43) operated by the piston (11) is provided to control the sectional expansible head (2) and the piston in turn is controlled by suitable fluid pressure, preferably compressed air, through the valve (44) from a source not shown.

A backing plate (45) supported by the yokes (46 and 46') attached to the hollow mandrel (9) is provided for the longitudinal seam (41), to be welded in the cylinder (37). The backing-plate (45) is made preferably of copper or an alloy of which copper forms a principal part, and its purpose is to provide a proper backing for the seam or joint to be welded that will not allow molten metal to fall inside of the joint as it is being welded and that will not fuse and stick to the work in the presence of melted iron or steel.

When it is desired to weld a longitudinal seam, as, for example, the one represented by the line 41, the welding machine (A) is moved to a point on the guide rail (35) by moving the carriage (39) thereon to an end of the joint to be welded. The friction pinion (20) is moved to the center of the friction disc (19) and there will cause no motion of the said friction disc (19) or the subsequent parts which it ordinarily drives. The nature of the worm gear will prevent the hollow mandrel (9) from being revolved or moved and it will remain firmly locked in place so long as the said friction pinion (20) remains at the center of the friction disc (19), excepting that when it is desired to manually revolve the said hollow mandrel (9) the jaw clutch (16) may be disengaged from the hub (15') and then the hollow mandrel (9) may be easily revolved to its desired position; it, for example, being desirable to have the backing plate (45) directly on top.

The electrode ($a'$) is adjusted the proper distance from the longitudinal seam to be welded and electric current applied thereto and will thereafter maintain an arc of predetermined intensity until the electric current applied thereto is turned off. Longitudinal motion along the seam to be welded, as for example the one represented by the dotted line 41, is produced at regulated speed by engagement of the grab nut (39) with the lead screw (34), which is being driven by the motor (23) in the manner heretofore specified and set forth.

When it is desired to weld a circumferential seam, as for example the one represented by numeral 42, the positive electrode ($a'$) is adjusted thereon in the manner heretofore explained for the longitudinal seam and the grab nut (39) is disengaged from the lead screw (34), allowing the carriage (39) and its superimposed welding machine (A) to remain fixed in one place. The circumferential seam to be welded is thereupon caused to revolve at a predetermined speed in the presence of the arc in the manner heretofore specified and set forth. Both the longitudinal seams hereinbefore mentioned and the circumferential seam just referred to, having been backed by copper, or similar non-ferrous material, the inner surface of the seam welded will be substantially smooth and flush with the surfaces of the plates, a uniform intensity of arc having been maintained by the welding machine (A), a uniform traverse of the work being welded having been accomplished by the mechanism described, it remains only to experiment or calculation to determine the proper intensity of arc and the proper interval of time that the work shall be exposed thereto, to make welds with this machine that shall be as perfect as is possible by any kind of electric welding, and by predetermination of the foregoing factors to make all welds absolutely uniform.

It is evident from the foregoing specification and illustrations forming a part of the same, that with the arc of an automatic electric arc welding machine maintained in fixed position, a circumferential seam may be revolved in its presence to be welded and conversely a longitudinal seam may be welded by moving the machine and the arc it produces longitudinally at predetermined speed. Both said motions being adjustable within wide ranges, it follows that a spiral seam may be welded with facility by producing both motions at once.

It is clearly evident that variations in sizes and arrangement of the mechanical devices hereinbefore described and illustrated may be made without substantially departing from the principles of my invention. I therefore do not narrowly restrict myself to the precise mechanism shown. It is also apparent that if non-ferrous structures are to be welded, the outer surface of the expansible head or backing for the weld should then be made of ferrous metals to prevent the same from fusing with the structures being welded.

What I claim as new and desire to secure by Letters Patent is:

1. In a machine of the character described, a work holding revoluble mandrel, a segmental expansible head portion for said mandrel; fluid piston means for operating said expansible head, means of the character described for revolving said mandrel in either direction selectively by increments in combination with an adjustable carriage for a welding means whereby a cylindrical shaped piece of work may have a seam thereof presented progressively to said welding means.

2. In a machine of the character described, a work holding revoluble mandrel, a segmental fluid piston operated head for said mandrel, means of the character described for revolving said mandrel selectively in either direction by increments or decrements of speed in combination with an adjustable carriage for a welding means, whereby a plurality of cylindrically shaped pieces of work may be held in axial alignment and circular outline for the purpose of presenting a girth seam to said welding means for accomplishing a butt weld.

3. In a machine of the character described, a work holding revoluble mandrel having a fluid piston operated expansible head adapted to hold work to be welded; means of the character specified for locking said mandrel against revolution; travelling carriage means for holding a welding machine adjustable with respect to work held on said mandrel, selective speed means for causing a longitudinal travel of said carriage whereby a longitudinal seam of work held in position on said mandrel is progressively acted upon by said welding means for accomplishing a butt welded longitudinal seam.

4. In a machine of the character described, a work holding revoluble mandrel of the character described and having a segmental fluid piston operated expansible head, coppery metal surface plates for the work holding surfaces of said expansible head in combination with adjustable guideway and carriage means for carrying a welding machine whereby a weld may be accomplished upon work held by said mandrel by progressively moving said welding machine over a seam to be welded at a predetermined distance from said seam.

5. In a machine of the character described, a revoluble expansible mandrel for holding the materials to be welded, suitable bearings for the support of said mandrel, a worm gear drive for said mandrel, a friction disc and friction pinion drive for said worm gear, a means of varying the position of contact of the said friction pinion with the said friction disc, whereby selective speeds of the said mandrel are produced in either direction without changing the direction of rotation of the said friction pinion.

6. In a machine of the character described, a revoluble expansible mandrel for holding materials to be welded, a friction disc and friction pinion drive of the kind specified, a central portion of said friction disc being turned to a lower plane than the general plane of said friction disc whereby the said friction pinion is relieved of contact with the said friction disc when coincident with the said central portion of said friction disc.

7. In a machine of the character described, a variable speed drive for said machine, selective speed transmissions between said drive and a revoluble mandrel, a cylinder forming a part of said mandrel, a piston within said cylinder, a piston rod operated by said piston, an expansible head attached to said mandrel and operated by said piston rod whereby two cylinders to be welded together are held rigidly in alignment and revolved at a selective speed in the presence of an arc of an electric arc welding machine.

8. In a machine of the character described, means for driving said machine, a revoluble expansible mandrel, variable speed transmission means between said drive and said mandrel, means for selectively causing the mandrel to revolve in either direction or remain firmly locked against revolution whereby a circumferential joint to be welded is caused to revolve at a predetermined speed and a longitudinal joint is maintained in fixed position, and an electric arc producing means adapted to remain in a fixed position for welding a circumferential joint and to move longitudinally for welding a longitudinal joint.

9. In a machine of the character described, means for driving said machine adapted to provide variable speeds, an expansible revoluble mandrel adapted to hold by its own means cylindrical vessels to be welded together by a circumferential seam, electric arc producing means, and adjustable means of applying said electric arc producing means to said circumferential seam and causing said mandrel to revolve at a predetermined speed.

10. In a machine of the character described, means for automatically producing an electric arc of a substantially uniform intensity upon material to be welded, means of producing a uniform traverse of the arc producing means over a longitudinal seam to be welded, comprising a carriage for said arc producing means, a vertically adjustable guideway for said carriage, a lead screw for said guideway, means for selectively causing engagement of said lead screw with said carriage, transmission means for said lead screw connecting it with a variable speed motor, said variable speed motor, and a mandrel of the character described for holding the material to be welded, said mandrel being provided with a backing surface.

11. In a machine of the character described, comprising a motor, a transmission of the character described between the said motor and a revoluble mandrel of the kind specified, said revoluble mandrel being adapted to hold cylindrically formed materials for welding by means of its contact with the inner surface of said cylindrically formed materials, a carriage for an automatic electric arc welding machine, an electric arc welding machine supported by said carriage, mechanisms of the character described to produce appropriate movement of the said welding machine with respect to the material to be welded, and selective means for causing the described motion of the said mandrel and the said welding machine.

12. In a machine of the character described, a work holding revoluble mandrel of the character described and having a fluid piston operated expansible head member adapted to hold two cylinders in axial alignment and circular outline with their respective ends abutting whereby the said abutting ends may be revolved in the presence of a fusible electrode held by an electric arc welding machine and a progressive butt weld accomplished at selective speed.

13. In a machine of the character described, a mandrel of the character described and illustrated and having selective speed means in either direction of rotation and means for locking against rotation at any point, in combination with a welding unit mounted on an adjustable carriage, said carriage being provided with adjustable speed means for accomplishing traverse of the said welding unit with respect to the work to be welded.

14. In a machine of the character described, a mandrel of the character specified and having an expansible fluid piston operated head in combination with an adjustable copper faced backing plate whereby a cylindrical piece of ferrous material to be welded may be held in operative relation to a welding unit and welded by the influence of an electric arc without fusing the cylindrical piece to the backing plate.

15. In a machine to hold cylinders to be welded, a mandrel of the character described and provided with variable speed transmissions and a locking device in combination with a variable speed carriage member adjustable as to distance from the mandrel and adapted to impart a selective uniform traverse to a welding unit mounted upon said carriage with respect to work held in position by said mandrel.

16. In a machine to hold work to be welded by electric arc welding processes, a revoluble mandrel having a fluid piston operated expansible head portion, a backing plate with a coppery contact surface to contact with work to be welded, coppery contact surfaces to the said expansible head in combination with carriage means for traversing a fusible electrode over work to be welded at selective speeds.

VICTOR A. NELSON.